United States Patent [19]

Atobe

[11] Patent Number: 5,001,567
[45] Date of Patent: Mar. 19, 1991

[54] RECORDING APPARATUS
[75] Inventor: Hiroshi Atobe, Yokohama, Japan
[73] Assignee: Canon Kabushiki Kaisha, Tokyo, Japan
[21] Appl. No.: 342,013
[22] Filed: Apr. 24, 1989
[30] Foreign Application Priority Data Apr. 25, 1988 [JP] Japan .................................. 63-100169

[51] Int. Cl.$^5$ ........................ H04N 1/29; G01D 15/14
[52] U.S. Cl. .................................... 358/300; 346/160; 346/108
[58] Field of Search ................ 346/108, 160; 358/296, 358/300, 302; 364/270.5, 271, 950.1, 950.3

[56] References Cited
U.S. PATENT DOCUMENTS
4,140,873 2/1979 Kinch ............................... 364/950.1

Primary Examiner—Bruce A. Reynolds
Assistant Examiner—Scott Rogers
Attorney, Agent, or Firm—Fitzpatrick, Cella Harper & Scinto

[57] ABSTRACT

A recording apparatus includes a receiving unit for receiving an image signal sent from an external apparatus, and a recording unit for performing a recording operation in accordance with the image signal received by the receiving unit. The receiving unit includes a clock signal generating unit for generating a clock signal used when receiving the image signal; and includes a first reception mode where the image signal is received without using the clock signal and a second reception mode where the image signal is received by using the clock signal. The receiving unit may include a first reception mode where the image signal is received by using a clock signal sent from the external apparatus and a second reception mode where the image signal is received without using the clock signal. The receiving unit may include a clock signal generating unit for generating a clock signal used when receiving the image signal, a first reception mode where the image signal is received in accordance with the clock signal sent from the external apparatus and a second reception mode where the image signal is received by sending the clock signal generated by the clock signal generating unit to the external apparatus.

13 Claims, 7 Drawing Sheets

RECORDING APPARATUS

BACKGROUND OF THE INVENTION

1. Field of the Invention

The present invention relates to a recording apparatus which performs a recording operation in accordance with inputted information.

2. Related Background Art

Among a plurality of printers, a laser beam printer is known as a recording apparatus which records an image by scanning a laser beam onto a rotary drum with a rotary polygon mirror and the like to form a latent image, and by transferring a developed latent image onto a recording sheet.

Figure 5:
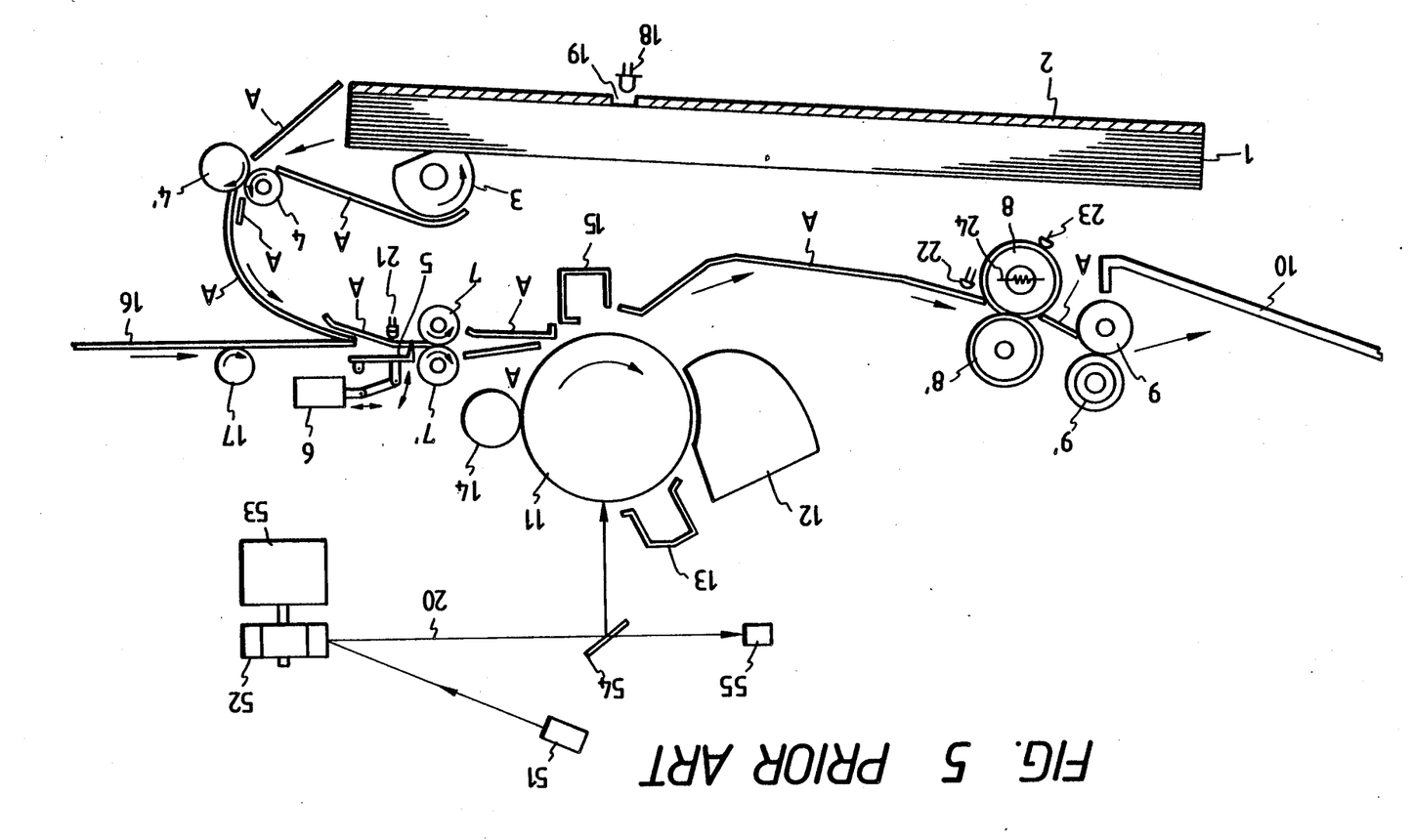
FIG. 5 is a view showing the structure of a conventional laser beam printer.

FIG. 5 shows the outline of the structure of a conventional laser beam printer which will be described while referring to FIG. 5.

In FIG. 5, reference numeral 1 represents a paper sheet as recording medium. A paper cassette 2 holds paper sheets 1. A paper feed cam 3 separates a single sheet from the top of the recording sheets 1 and conveys the tip portion of the separated sheet 1 to the position of paper feed rollers 4 and 4'. The paper feed cam 3 is driven by drive means (not shown) and intermittently rotated each time when a paper sheet is fed.

A reflective type photosensor 18 detects if a sheet is not present or not by detecting a reflected light from a sheet 1 via a aperture 19 formed in the bottom of the paper cassette 2.

When the sheet 1 reaches the clearance between the paper feed rollers 4 and 4' while being transported by means of the paper feed cam 3, the paper feed rollers 4 and 4' rotate while lightly squeezing the sheet 1 and further transport it.

When the tip end of the sheet 1 reaches the position of a registration shutter 5, the sheet 1 is stopped by the registration shutter 5. Whereas the paper feed rollers 4 and 4' continue to generate a transport torque and rotates while slip-contacting the sheet 1. In such condition, if a registration solenoid 6 is energized to move the registration shutter 5 upward in the figure, the transport stop of the sheet 1 is released so that the sheet 1 is sent to transport rollers 7 and 7'.

The registration shutter 5 is driven in synchro with the exposure timings of a laser beam 20. A photosensor 21 is disposed near the registration shutter 5 for detecting whether or not the sheet 1 is present at the registration shutter 5.

A rotary polygon mirror 52 driven by a polygon mirror motor 53 reflects the laser beam 20 and scans it. The laser beam 20 emitted from a semiconductor laser 51 is directed to a photosensitive drum 11 via the polygon mirror 52 and a reflective mirror 54 to thus form a latent image on the photosensitive drum 11. The beam 20 applied to the photosensitive drum 11 is detected by a beam detector 55 disposed at the scan start position of the beam 20 so that a BD signal is outputted which represents an image write timing in the main scan direction (horizontal synchro timing).

Thereafter, the sheet 1 is sent to the photosensitive drum 11 by means of the transport rollers 7 and 7' instead of the paper feed rollers 4 and 4'. A latent image exposed on the photosensitive drum 11 is developed by means of a combination of a cleaner 12, charger 13, developing unit 14, and transfer charger 15. The developed image is then transferred onto the sheet 1 which is fixed with fixing rollers 8 and 8' and ejected out to a stacker 10 by means of paper discharge rollers 9 and 9'. A symbol A show in FIG. 5 represents a guide for restricting the transport direction of the sheet 1.

A paper feed plate 16 allows paper sheets to be manually fed one after another to the printer, in addition to automatic paper feed from the paper cassette 2. A sheet manually fed by an operator at the position between the paper feed plate 16 and a manual feed roller 17 is transported while lightly pressed by the manual feed roller 17. In the similar manner as of the paper feed rollers 4 and 4', when the tip end of the sheet reaches the registration shutter 5, the paper feed roller 17 rotates while slip-contacting the sheet. The succeeding transport sequence is quite the same as the paper cassette feed.

The fixing roller 8 includes therein a fixing heater 24 which heats the roller surface thereof. A thermistor 23 for detection of the surface temperature of the fixing roller is disposed so as to slip-contact the surface of the fixing roller 8. The surface temperature of the fixing roller 8 is controlled to a predetermined temperature in accordance with the detected temperature by the thermistor 23, to thereby thermally fix an image recorded on the sheet 1.

A photosensor 22 is disposed at a position where it is detected if a sheet is present at the fixing rollers 8 and 8'.

The laser printer of such structure is not generally used independently, but is connected to external apparatus such as an image processing apparatus via interface cables (as a prior art of external apparatus, there are known for example U.S. Pat. No. 4,686,525, and U.S. Ser. No. 914,199 filed on Oct. 1, 1986 and others). Upon reception of a print command and image signal from the external apparatus via interface cables, the laser beam printer executes a predetermined print sequence (operation procedure) to print the image signal.

Signals for transmission between an external apparatus and a usual printer such as a laser printer are generally transferred in the form of serial signals at clock timings of a predetermined period. Therefore, an image clock signal generator for generating a signal transfer clock is provided either at the external apparatus or at the printer.

Figure 6:
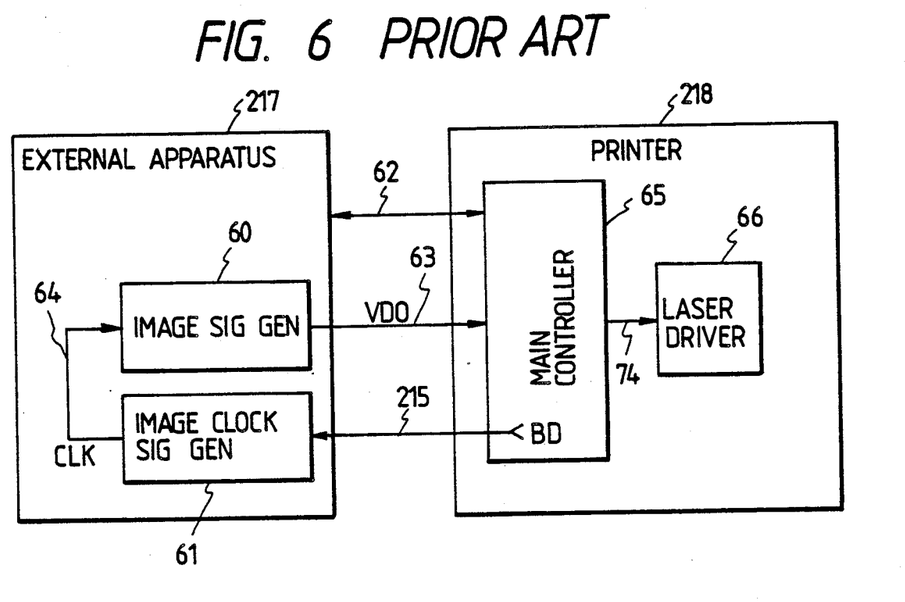
FIGS. 6 to 8 are block diagrams showing examples of conventional interconnections between external apparatus and printers.

FIG. 6 shows an example of the structure of an external apparatus having an image clock signal generator.

Referring to FIG. 6, an external apparatus 217 outputs information regarding an image signal, control signal and the like to a printer 218. A signal line 62 is used for transfer of various control signals such as a print command and the like in the form of serial signals. A signal line 63 is used for transfer of an image signal VDO. A signal line 215 is used for transfer of a horizontal synchro signal BD. A main controller 65 for controlling the entirety of the printer is provided within the printer 218. Also provided for the printer is an interface circuit (not shown) for use in controlling input/output of the above-described signals.

The main controller controls the operations of the elements shown in FIG. 5, and supplies an image signal to a laser driver 66 which drives the semiconductor laser 51 (refer to FIG. 5).

The external apparatus 217 is provided with an image clock signal generator 61 for transmission of an image clock signal CLK to an image signal generator 60 which generates an image signal to be printed. With the constructed as above, when a horizontal synchro signal BD representative of the record start timing of one horizontal line is transmitted from the main controller to the image clock signal generator 61, the image clock signal generator 61 is triggered with this BD signal and generates a clock signal CLK (image clock signal) of a predetermined period. The image signal generator 60 transmits an image signal VDO to be printed to the main controller 65 via the signal line 63 in synchro with the image clock signal CLK. The main controller 65 converts the received image signal 63 into a laser drive signal 74 and sends it to the laser driver 66. If for example an image signal at a certain print position takes a bit "1", the laser drive signal is turned on to energize the semiconductor laser 51.

The laser beam is turned on and off in accordance with the laser drive signal to thus form a latent image on the photosensitive drum 11. The latent image is developed by adding toner thereto by means of the developing unit 14 and thereafter, transferred onto a paper sheet by means of the transfer charger 15 and fixed by the fixing rollers 8 and 8'. The recorded paper sheet is then ejected out.

Figure 7:
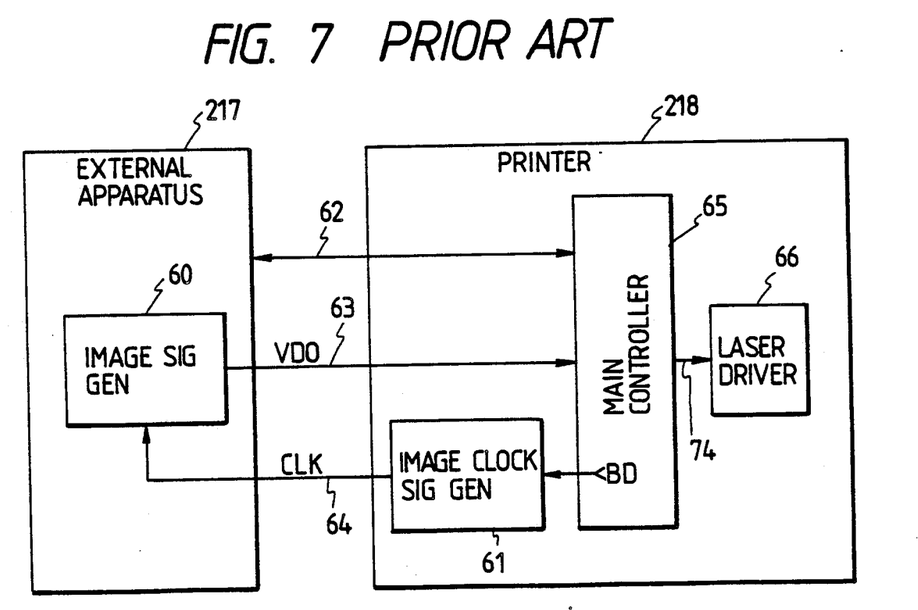

FIG. 7 shows another example of the image clock signal generator.

In FIG. 7, elements having similar functions to those shown in FIG. 6 are designated by using identical reference numerals. The example shown in FIG. 7 has an image clock generator 61 on the side of a printer 218.

In conventional apparatus, there are a printer of the type which receives an image signal in synchro with an image clock signal generated by the external apparatus 217, and a printer of the type which receives an image signal in synchro with an image clock signal generated by the printer. There arises therefore a problem that the type of a printer should be selected in accordance with the type of an external apparatus. For instance, if both the external apparatus 217 and printer 218 are not provided with the image clock signal generator 61, then there is no compatibility between the external apparatus 217 and printer 218 which are not connectable accordingly.

Figure 8:
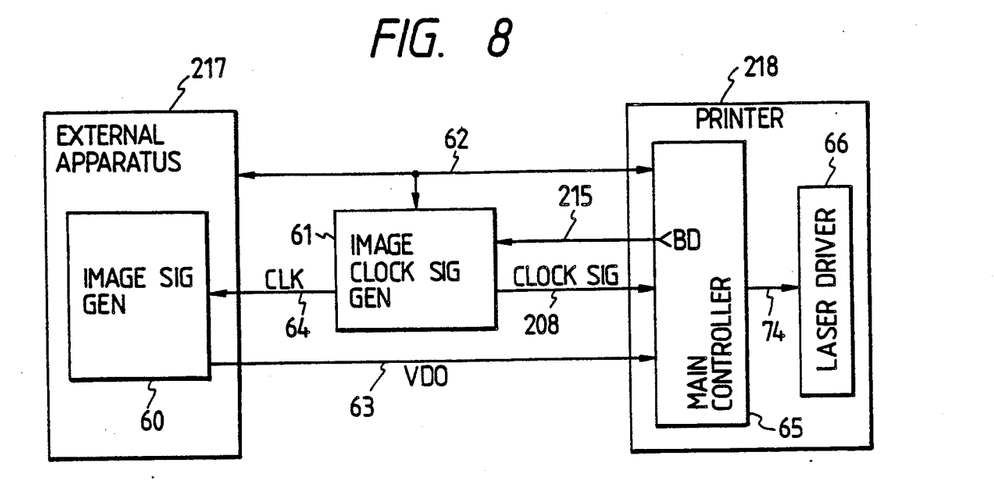

It can be also considered that a specific image clock signal generator 61 may be provided at signal lines between an external apparatus 217 and a printer 218. However, this arrangement results in very complicated interconnections. In FIG. 8, elements having similar functions to those shown in FIG. 6 are represented by using identical reference numerals.

The assignee of the present application has proposed an improvement on recording apparatus as disclosed in U.S. Ser. No. 041,635 filed on Apr. 23, 1987, now abandoned and refiled as an FWC U.S. Ser. No. 07/291,349 filed on Dec. 29, 1988, now also abandoned and refiled as an FWC U.S. Ser. No. 07/554,187 filed July 20, 1990 and U.S. Pat. No. 4,695,849. A further improvement has been desired heretofore.

SUMMARY OF THE INVENTION

It is an object of the present invention to eliminate the above-described disadvantages.

It is another object of the present invention to improve a recording apparatus.

It is a further object of the present invention to provide a recording apparatus capable of being connected to external apparatus of various types.

It is a still further object of the present invention to provide a recording apparatus having an improved function.

It is another object of the present invention to provide a recording apparatus capable of switching the operation modes in accordance with an external apparatus to be connected.

It is a further object of the present invention to provide a recording apparatus capable of being connected to both the external apparatus with and without an image clock signal generator.

It is a still further object to provide a recording apparatus with great versatility.

It is a still further object of the present invention to provide a recording apparatus capable of setting an operation mode in accordance with the utilization field of the apparatus.

The above and other objects of the present invention will become apparent from the following detailed description and claims when read in connection with the accompanying drawings.

DETAILED DESCRIPTION OF THE PREFERRED EMBODIMENT

An embodiment of the recording apparatus of this invention will be described with reference to the accompanying drawings.

According to the recording apparatus of this embodiment, the operation mode is switched in accordance with the type of an external apparatus to be connected. The description will be given hereinbelow for each type of an external apparatus to be connected. The print unit of the recording apparatus of this embodiment uses the laser beam printer shown in FIG. 5.

FIGS. 1 to 4 show various examples of the image output system arrangement of the present embodiment.

Figure 1:
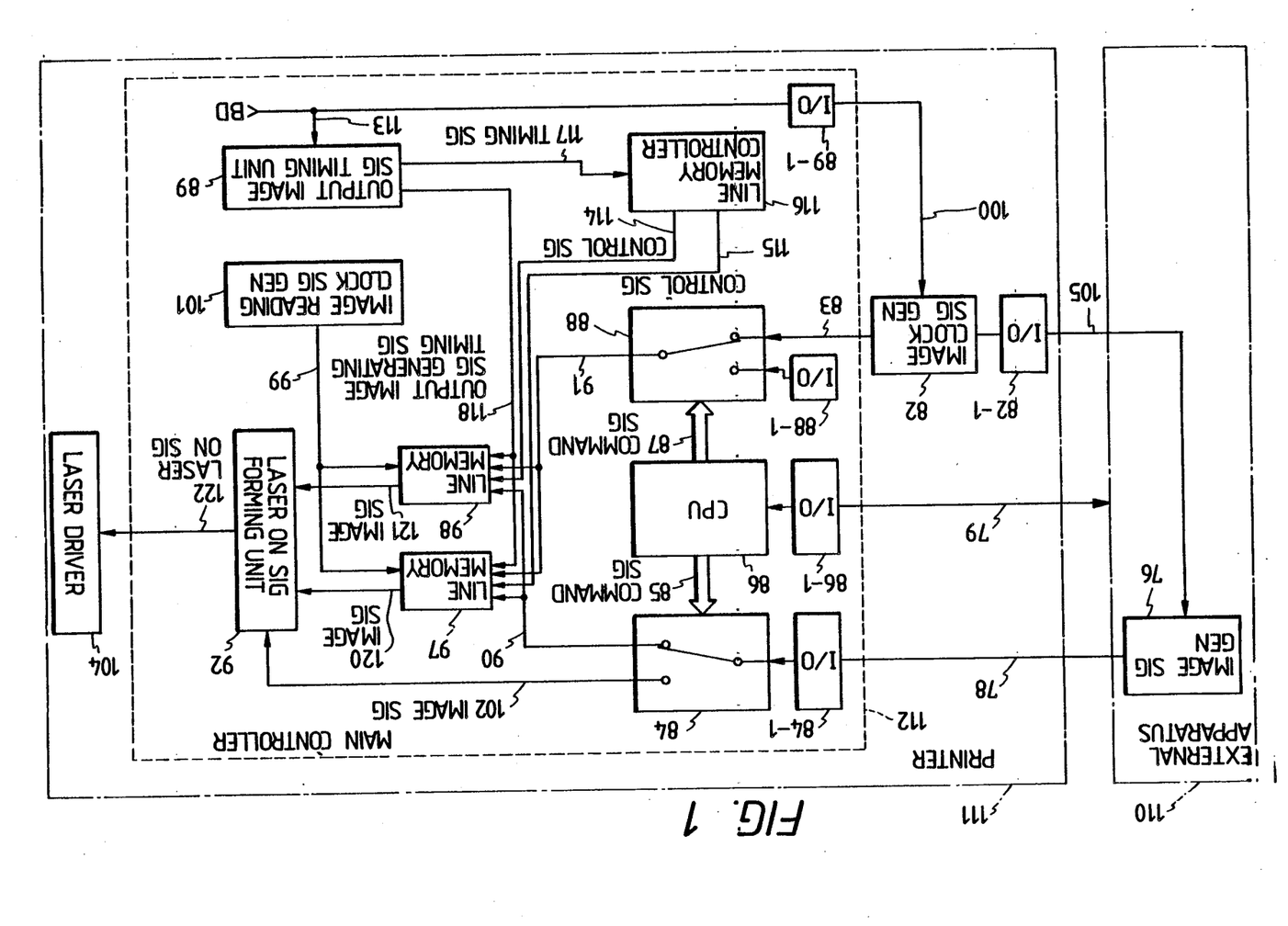
FIGS. 1 to 4 are views showing the recording apparatus of an embodiment of this invention connected to various types of external apparatus.

FIG. 1 shows an example of interconnection between an external apparatus 110 without an image clock generator and a printer 111.

Referring to FIG. 1, the external apparatus 110 outputs an image signal 78 generated by an image signal generator 76. A one-dot-chain line represents the printer 111. A main controller 112 controls the entirety of the printer 111. An image clock signal generator 82 generates an image clock signal which is used as a synchro signal when the image signal 78 is transferred from the external apparatus 110 to the printer 111. The image clock signal generated by the image clock signal generator 82 is applied to the image signal generator 76 of the external apparatus 110 via an output signal interface 82-1 (I/O), and to an image clock signal switch 88 to be described below.

The image clock signal switch 88 selectively switches between an image clock signal inputted from the external apparatus via the interface (I/0) 88-1 and an image clock signal outputted from the image clock signal generator 82, in accordance with a command signal from a central processing unit (CPU) 86.

In the arrangement shown in FIG. 1, it is possible for CPU 86 to judge based on a control signal (command) 79 from the external apparatus 110. Therefore, the image clock signal 105 from the image clock signal generator 82 provided within the printer is sent to the external apparatus 110. Further, use of line memories 97 and 98 is instructed in accordance with a command so that CPU controls the image clock signal switch 88 and output image signal selector 84 to supply the image clock signal 83 from the image clock signal generator 82 to the line memories 97 and 98, and the image signal 90 inputted via an interface 84-1 to the line memories 97 and 98.

The image clock signal 91 selected by the image clock signal switch 88 is used as a synchro signal for writing the image signal 90 into the like memory 97 or 98. The line memories 97 and 98 alternately store therein the image signal for each line transmitted from the external apparatus 110. The selection between the line memories is conducted by control signals from a line memory controller 116. An output image signal timing unit 89 instructs read/write of the image signal with respect to the line memory controller 116 and line memories 97 and 98 in accordance with the horizontal synchro signal (BD signal) 100. In reading the image signal, an image read clock signal generator 101 outputs a read clock signal 99 to the line memories in synchro with print operation. The line memory controller 116, output image signal timing unit 89, and image read clock signal generator 101 are well known, so the detailed description is omitted. A laser-on signal forming unit 92 generates a signal 122 for driving a laser driver 104. The laser-on signal forming unit 92 is inputted with the image signal of either outputs 120 and 121 from the line memories 97 and 98 or an output 102 from the output image signal selector 84.

With the circuit arrangement described above, prior to print operation, an operator instructs CPU 86 by using a keyboard (not shown) if the image signal is to be stored in the line memories 97 and 98, and if the image clock signal generated by the image clock signal generator 82 is to be used for image signal transfer. These instructions are sent from the external apparatus 110 to CPU 86 as the command signal 79. CPU 86 then instructs a drive of the image clock signal generator 82, selection at the output image signal selector 84, and switching at the image clock signal switch 88.

The recording operation of the embodiment will be described next.

Upon designation of a reception mode of the image signal by an operator as described previously, the printer 111 is enabled. Then, the image clock signal generator 82 generates the image clock signal 105, 83 in synchro with the horizontal synchro signal BD. In response to the image clock signal, the image signal generator 76 of the external apparatus 110 generates the image signal 78.

The image signal 78 is sent via a signal path from I/0 84-1, to output image signal selector 84 and to line memories 97 and 98. The inputted image signal 78 is temporarily stored in the line memories 97 and 98. While the image signal is written in one of the line memories 97 and 98, the image signal is read out from the other of the line memories 97 and 98. In accordance with the read-out image signal, the laser driver 104 drives the semiconductor laser to record the image. According to the arrangement shown in FIG. 1, it is not necessary for the external apparatus 110 to be equipped with an image clock signal generator, thus reducing the burden on the external apparatus 110.

Figure 2:
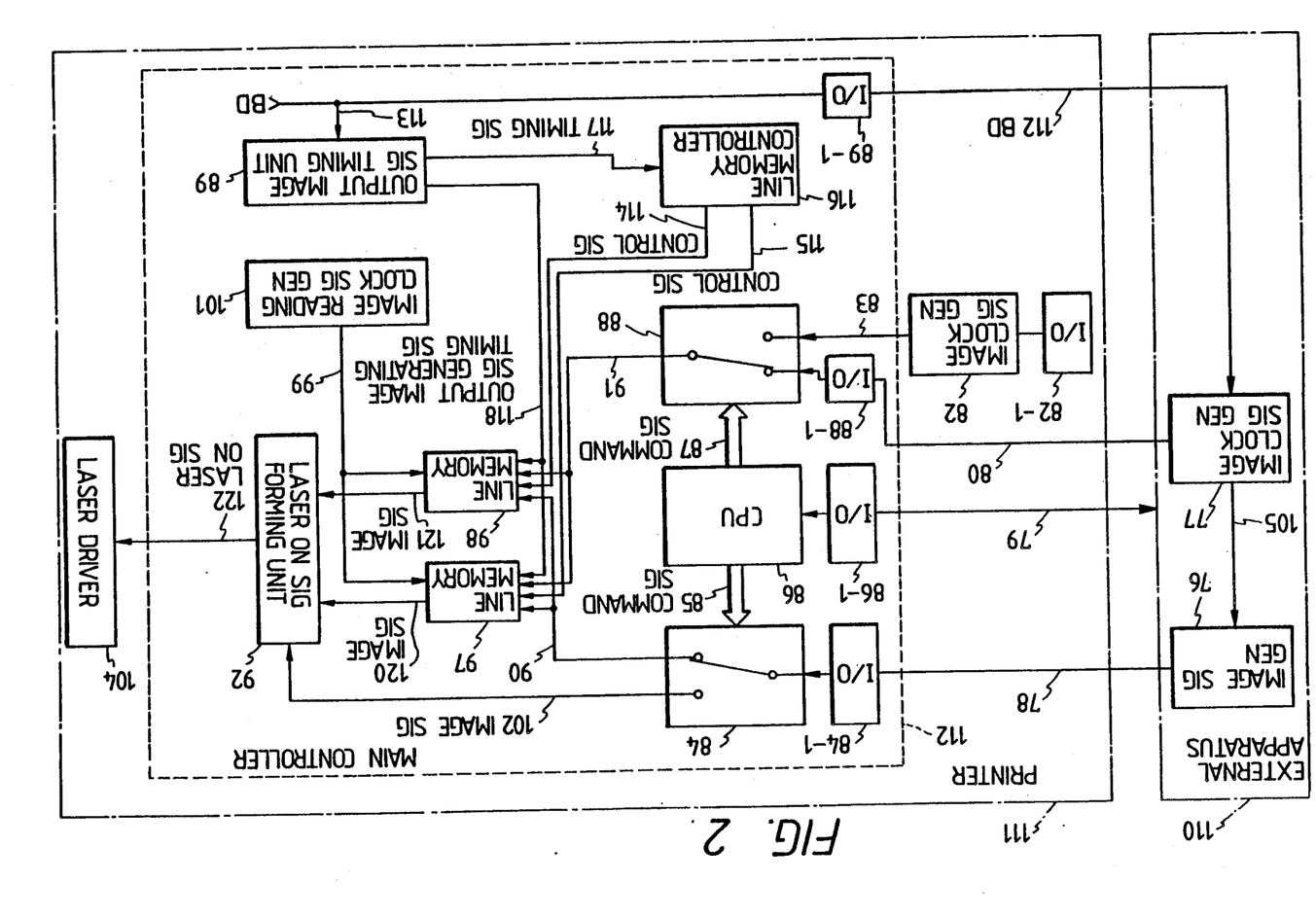
Figure 3:
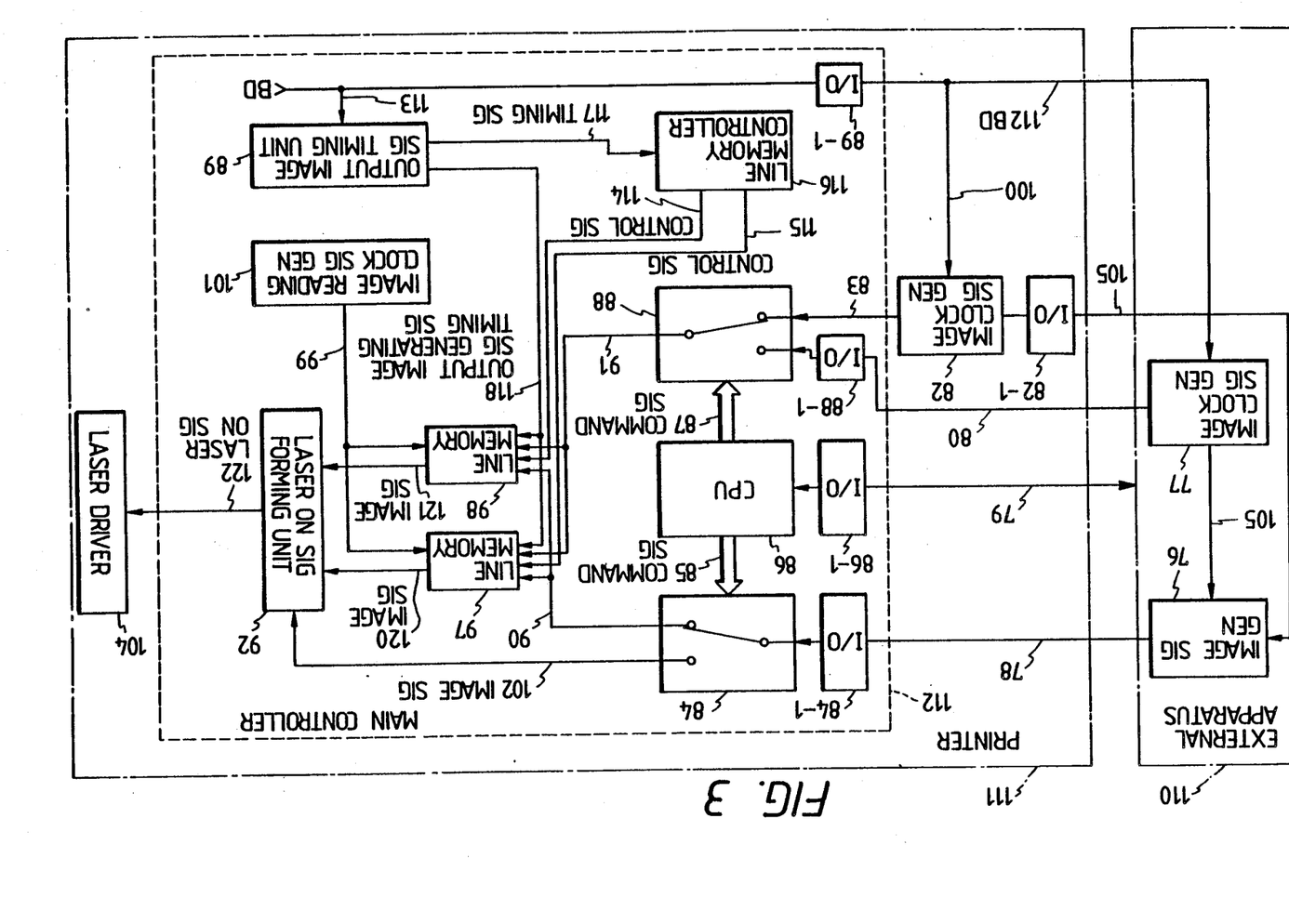
Figure 4:
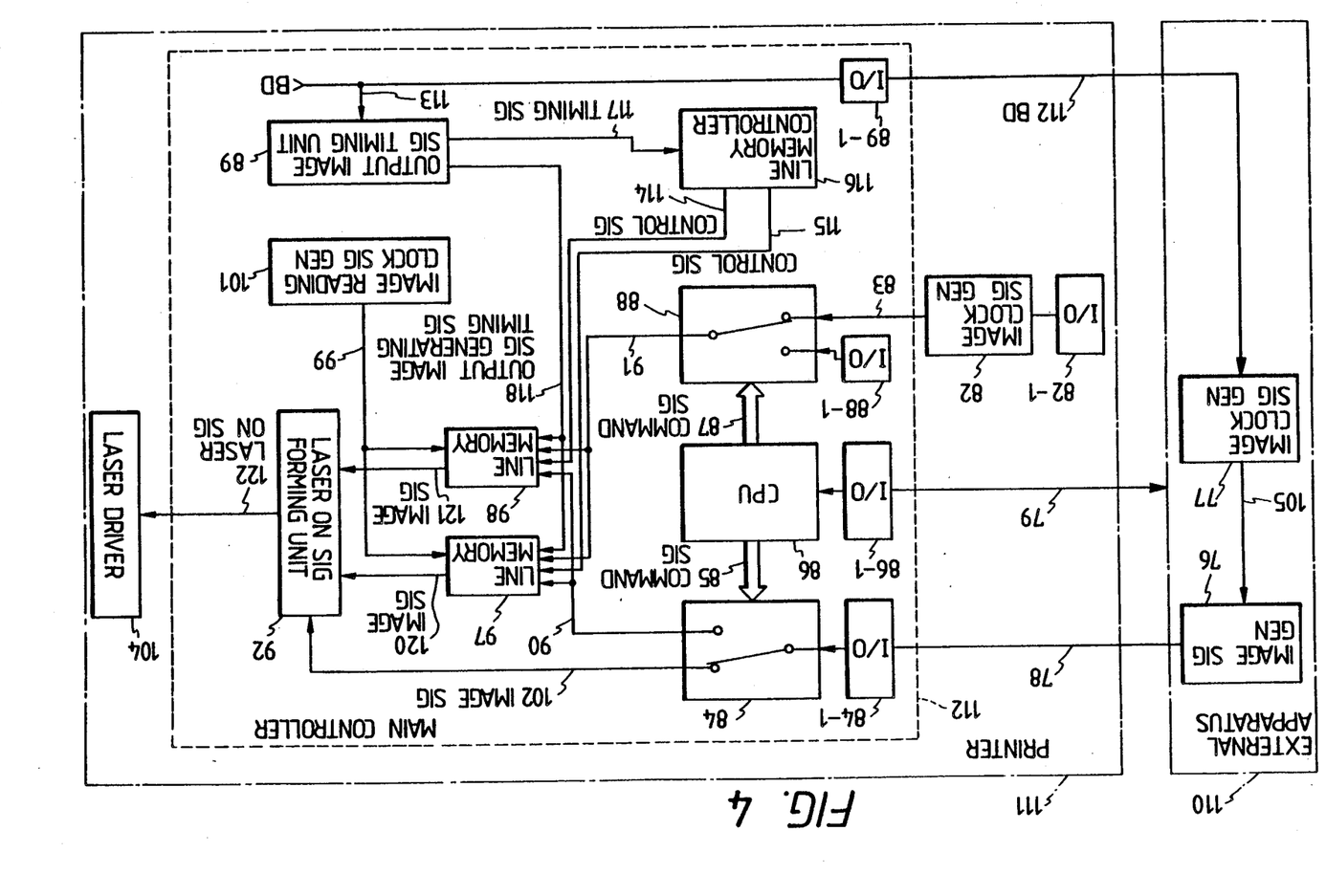

FIGS. 2 to 4 show examples of interconnection between a printer 111 and an external apparatus 110 with an image clock signal generator 77. Like elements to those in FIG. 1 are represented by using identical reference numerals in FIGS. 2 to 4.

FIG. 2 shows an example where an image clock signal 105 sent from an image clock signal generator 77 of the external apparatus 110 is applied to an image signal generator 76, and the image clock signal 80 is used as a write clock for line memories 97 and 98.

In the arrangement shown in FIG. 2, CPU 86 can judge based on a control signal (command) 79 from the external apparatus 110 that the external apparatus 110 is equipped with the image clock signal generator 77, and that the image clock signal 105, 80 from the image clock signal generator 77 is used for transferring the image signal and writing the image signal into the line memories. Therefore, in accordance with the command, CPU 86 controls an image clock signal switch 88, and output image signal selector 84 to apply the image clock signal 80 inputted through an interface 88-1 to the line memories 97 and 98, and write the image signal 78 inputted through an interface 84-1 to the line memories 97 and 98. According to the arrangement shown in FIG. 2, the printer can latch the image signal in response to the image clock signal sent from the external apparatus. Therefore, there is no phase shift at the time of latching the image signal, thereby enabling long-distance transmission of an image signal.

FIG. 3 shows an example where selectively used is either an image clock signal 80, 105 from an image clock signal generator 77 of an external apparatus 110 or an image clock signal from an image clock signal generator 88 of a printer 111. In this example, in accordance with the switching state of an image clock signal switch 88, an image signal generator 76 of the external apparatus 110 selects one of the output signals from the image clock signal generators 82 and 77.

In the arrangement shown in FIG. 3, CPU 86 selects either the image clock signal generator 77 of the external apparatus 110 or the image clock signal generator 82 of the printer 111 in accordance with a signal (command) 79 from the external apparatus. CPU 86 controls the image clock signal switch 88 in accordance with a selected signal source of the image clock signal such that the image signal from the selected image clock signal generator is applied to line memories 97 and 98.

Similar to the case shown in FIG. 2, CPU 86 controls an output signal selector 84 in accordance with the command to send an image signal 78 inputted via an interface 84-1 to the line memories 97 and 98.

FIG. 4 shows an example where an image clock signal 105 sent from an image clock signal generator 79 of an external apparatus 110 is applied to an image signal generator 76. The example shown in FIG. 4 differs from the examples shown in FIGS. 1 to 3 in that the image clock signal is not sent from the external apparatus to a printer or vice versa. In the example shown in FIG. 4, CPU 86 can judge based on a control signal (command) 79 from the external apparatus that the external apparatus 110 is equipped with the image clock signal generator 77, and that line memories 97 and 98 are not used in this operation mode. Therefore, CPU 86 controls an output image signal selector 84 in accordance with a command such that an image signal 78 inputted via an interface 84-1 is directly sent to a laser-on signal forming unit 92 without using the line memories 97 and 98. According to the arrangement shown in FIG. 4, there is no need of a transmission line for the image clock signal so that interconnection between the external apparatus and the printer can be simplified further.

The control flow chart executed by CPU 86 is shown in FIG. 5. The operation by CPU 86 will be described hereinbelow. The program of the control flow chart shown in FIG. 5 is stored in a ROM (not shown).

Figure 9:
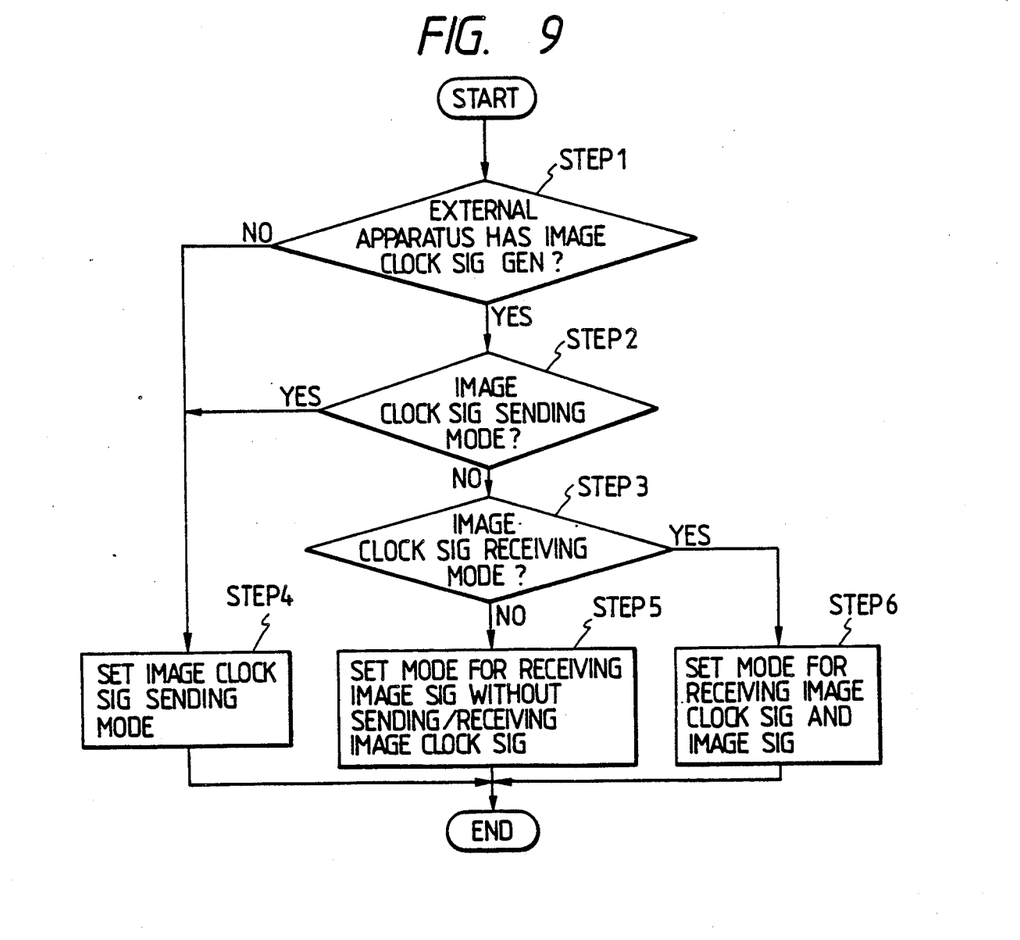
FIG. 9 is a control flow chart illustrating an operation mode setting according to the embodiment.

At step 1, CPU 86 checks based on a control signal (command) 79 inputted from the external apparatus 110 if the external apparatus 110 connected to the printer 111 has an image clock signal generator. If not, the flow advances to step 4 to set a mode where an image clock signal 105 generated by the image clock signal generator 82 of the printer 111 is sent via an interface I/O 82-1 to the image signal generator 76. In addition, an operation designation signal 87 causes the image clock signal switch 88 to switch to the image clock signal generator 82.

CPU 86 also causes the output image signal selector 84 to be switched to the line memories 97 and 98 in response to an operation designation signal 85.

If the external apparatus 110 connected to the printer 111 has an image clock signal generator at step 1, then the flow advances to step 2.

CPU 86 judges based on a command inputted from the external apparatus if the operation mode is for transmitting an image clock signal generated by the image clock signal generator 82 to the external apparatus 110. If YES at step 2, it is judged that the image clock signal generator 77 of the external apparatus 110 is not used for image signal transfer, and the flow advances to step 4.

If NO at step 2, the flow advances to step 3 to judge based on a command inputted from the external apparatus if the operation mode is for receiving an image clock signal generated at the external apparatus. If not at step 3, the flow advances to step 5.

At step 5, the printer 111 is set at the mode where an image clock signal is not transferred between the external apparatus and printer, and the output image signal selector 84 is switched to the laser-on signal forming unit 92 in response to an operation designation signal 85. If it is judged at step 3 as the mode for receiving an image signal and image clock signal generated by the external apparatus, the flow advances to step 6 whereat the image clock signal switch 88 is switched to the image clock signal generator 77 in response to an operation designation signal 87 to receive an image clock signal 80. CPU 86 also causes the output image signal selector 84 to be switched to the line memories 97 and 98 in response to an operation designation signal.

As described in detail, the printer of this embodiment can be connected to various types of external apparatus to thus allow an image output system matching a particular application.

The printer of this embodiment has line memories so that an image processing circuit for edge emphasis or the like can be added easily.

In the embodiment printer, an image signal reception mode and image clock signal reception/transient from the external apparatus. However, an operator may set any mode as desired by providing the printer with a dip switch or the like for mode setting.

In the above embodiment, a laser beam printer has been used as the recording apparatus. However, the invention is also applicable to thermal printers, LED printers, ink jet printers, LCD printers and the like.

The present invention is not limited to the above embodiment, but various modifications are possible within the scope of the appended claims.

What is claimed is:

1. A recording apparatus comprising:
   receiving means for receiving an image signal sent from an external apparatus; and
   recording means for performing a recording operation in accordance with said image signal received by said receiving means;
   wherein said receiving means comprises clock signal generating means for generating a clock signal used when receiving said image signal; and includes
   a first reception mode where said image signal is received without using said clock signal and a second reception mode where said image signal is received by using said clock signal,
   wherein said second reception mode is a mode where said image signal is received by transmitting said clock signal generated by said clock signal generating means to said external apparatus.

2. A recording apparatus comprising:
   receiving means for receiving an image signal sent from an external apparatus; and
   recording means for performing a recording operation in accordance with said image signal received by said receiving means;
   wherein said receiving means comprises clock signal generating means for generating a clock signal used when receiving said image signal; and includes
   a first reception mode where said image signal is received without using said clock signal and a second reception mode where said image signal is received by using said clock signal,
   wherein said first and second reception modes are set in accordance with a command sent from said external apparatus.

3. A recording apparatus comprising:
   receiving means for receiving an image signal sent from an external apparatus; and
   recording means for performing a recording operation in accordance with said image signal received by said receiving means;
   wherein said receiving means includes a first reception mode where said image signal is received by using a clock signal sent from said external apparatus and a second reception mode where said image signal is received without using said clock signal,
   wherein said receiving means comprises clock signal generating means for generating a clock signal used when receiving said image signal, and a third reception mode where said image signal is received by transmitting said clock signal generated by said clock signal generating means to said external apparatus.

4. A recording apparatus according to claim 3, wherein said first, second and third reception modes are set in accordance with a command sent from said external apparatus.

5. A recording apparatus comprising:
   receiving means for receiving an image signal sent from an external apparatus; and
   recording means for performing a recording operation in accordance with said image signal received by said receiving means;
   wherein said receiving means includes a first reception mode where said image signal is received by using a clock signal sent from said external apparatus and a second reception mode where said image signal is received without using said clock signal, wherein said receiving means comprises storage means for storing said image signal in accordance with said clock signal sent from said external apparatus.

6. A recording apparatus comprising:

receiving means for receiving an image signal sent from an external apparatus; and recording means for performing a recording operation in accordance with said image signal received by said receiving means;

wherein said receiving means comprises clock signal generating means for generating a clock signal used when receiving said image signal; and includes a first reception mode where said image signal is received in accordance with said clock signal sent from said external apparatus and a second reception mode where said image signal is received by sending said clock signal generated by said clock signal generating means to said external apparatus, wherein said receiving means includes a third reception mode where said image signal is received without using both said clock signal sent from the external apparatus and said clock signal generated from said clock signal generating means.

7. A recording apparatus comprising:

receiving means for receiving an image signal sent from an external apparatus; and recording means for performing a recording operation in accordance with said image signal received by said receiving means;

wherein said receiving means comprises clock signal generating means for generating a clock signal used when receiving said image signal; and includes a first reception mode where said image signal is received in accordance with said clock signal sent from said external apparatus and a second reception mode where said image signal is received by sending said clock signal generated by said clock signal generating means to said external apparatus, wherein said first and second reception modes are set in accordance with a command sent from said external apparatus.

8. A recording apparatus comprising:

receiving means for receiving an image signal sent from an external apparatus; and recording means for performing a recording operation in accordance with said image signal received by said receiving means;

wherein said receiving means comprises clock signal generating means for generating a clock signal used when receiving said image signal; and includes a first reception mode where said image signal is received in accordance with said clock signal sent from said external apparatus and a second reception mode where said image signal is received by sending said clock signal generated by said clock signal generating means to said external apparatus, wherein said receiving means includes memory means for storing therein said image signal on the basis of the clock signal sent from said external apparatus or the clock signal generated from said clock signal generating means.

9. A recording apparatus, comprising:

an image signal generator for generating an image signal;

a receiving unit for receiving the image signal generated by said image signal generator, said receiving unit having a clock signal generator for generating a clock signal; and a recording unit for performing a recording operation in accordance with the image signal received by said receiving unit;

wherein said recording apparatus has a first mode where said receiving unit sends the clock signal generated by said clock signal generator and receives the image signal sent from said image signal generator by using the clock signal, and a second mode where said receiving unit receives the image signal sent from said image signal generator without using the clock signal generated by said clock signal generator.

10. A recording apparatus according to claim 9, wherein said image signal generator is provided outside of a housing for physically receiving said receiving unit and said recording unit.

11. A recording apparatus, comprising:

an image signal generator for generating an image signal;

a receiving unit for receiving the image signal generated by said image signal generator, said receiving unit having a clock signal generator for generating a clock signal and a memory for storing the received image signal; and a recording unit for performing a recording operation in accordance with the image signal received by said receiving unit;

wherein the recording apparatus has a first reception mode where said receiving unit receives the image signal without using said memory, and a second reception mode where said receiving unit receives the image signal by storing the image signal sent from said image signal generator in said memory in accordance with the clock signal generated by said clock signal generator.

12. A recording apparatus according to claim 11, wherein one of said first and second reception modes is selectively set in accordance with a command sent from said image signal generator.

13. A recording apparatus according to claim 11, wherein said image signal generator is provided outside of a housing for physically receiving said receiving unit and said recording unit.

* * * * *